Figure 1:
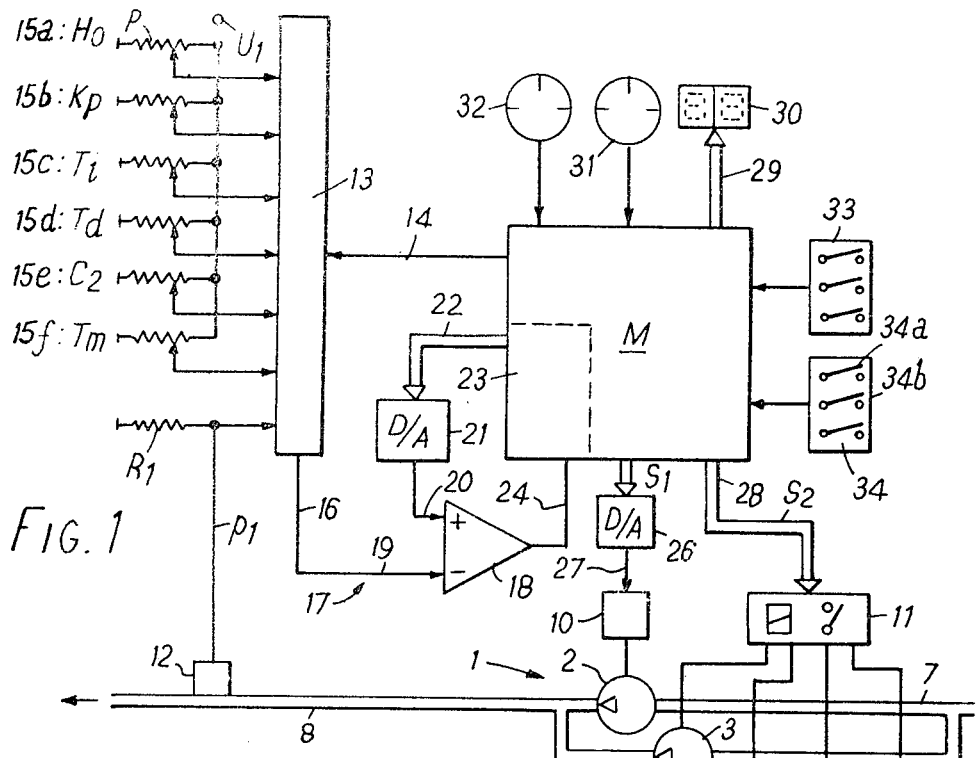

United States Patent [19]

Jorgensen et al.

[11] 4,259,038
[45] Mar. 31, 1981

[54] METHOD AND REGULATOR FOR CONTROLLING THE DELIVERY OF A PUMP ARRANGEMENT ACCORDING TO DEMAND

[75] Inventors: Iver Jorgensen, Nordborg; Steen Veigert, Grasten; Niels E. Andersen, Augustenborg, all of Denmark

[73] Assignee: Danfoss A/S, Nordborg, Denmark

[21] Appl. No.: 969,834

[22] Filed: Dec. 15, 1978

[30] Foreign Application Priority Data

Dec. 21, 1977 [DE] Fed. Rep. of Germany ....... 2756916

[51] Int. Cl.³ ............................................. F04B 49/06
[52] U.S. Cl. .......................................... 417/53; 417/5
[58] Field of Search ....................................... 417/2-9, 417/18, 53; 137/3

[56] References Cited

U.S. PATENT DOCUMENTS

| | | | |
|---|---|---|---|
| 3,005,411 | 10/1961 | Metz | 417/6 |
| 3,294,023 | 12/1966 | Martin-Vegue et al. | 417/7 |
| 3,605,775 | 9/1971 | Zaarder et al. | 137/3 |
| 3,732,034 | 5/1973 | Reid | 417/6 |
| 3,744,932 | 7/1973 | Prouett | 417/7 |
| 4,108,574 | 8/1978 | Bartley et al. | 417/22 |

FOREIGN PATENT DOCUMENTS

| | | | |
|---|---|---|---|
| 672708 | 10/1963 | Canada | 417/2 |
| 91659 | 4/1977 | Japan | 417/5 |

*Primary Examiner*—William L. Freeh
*Attorney, Agent, or Firm*—Wayne B. Easton

[57] ABSTRACT

The invention relates to a pumping system for supplying fluid at a variable delivery rate in accordance with demand. The system includes one pump having a variable delivery rate and one or more auxiliary pumps arranged in parallel therewith, each having a fixed delivery rate. The variable delivery pump operates over a predetermined control range between minimum and maximum rates. Each fixed delivery rate pump has on and off operating modes with the on mode delivery rate being at the maximum delivery rate of the variable delivery pump. A control unit for operating the pumps matches the pump delivery with the demand. The control unit functions to set the variable delivery pump at its minimum delivery rate when operation of the fixed delivery pump is initiated during upward demand control and for setting it at its maximum delivery rate when operation of the fixed delivery pump is terminated during downward demand control.

3 Claims, 2 Drawing Figures

METHOD AND REGULATOR FOR CONTROLLING THE DELIVERY OF A PUMP ARRANGEMENT ACCORDING TO DEMAND

The invention relates to a method of controlling the delivery of a pump arrangement according to need, particularly for a waterworks, and to a regulator for performing this method.

When operating a waterworks, care must be taken that the pressure in the system is kept within certain limits, namely regardless of the amount of water taken. This is, for example, achieved in that a pump with a constant delivery is switched on when the water level falls below a predetermined limit in a water tower and is only switched off again when an upper limit is exceeded. Similar conditions obtain in an air vessel; the pump is switched on when the pressure in the air vessel falls below a lower limiting value and is only switched off again when this pressure exceeds an upper limiting value. With this procedure, certain pressure fluctuations are inevitable. In addition, a pressure storer is required which substantially maintains the pressure at those times when the pump is inoperative.

Regulating pumps are also known in which a change in the delivery is possible by varying the speed. However, such regulating pumps are extraordinarily expensive, particularly in the case of large capacities.

The invention is based on the problem of providing a method of the aforementioned kind with which in a pump arrangement designed for larger capacities a desired pressure is maintained at viable costs even if the amount of liquid withdrawn varies considerably.

This problem is solved according to the invention in that the delivery is continuously changed in response to pressure in that a regulating pump with a driving speed which is continuously variable in a predetermined control range is operated alone in a lower delivery zone and at least one auxiliary pump with a constant driving speed is operated in parallel thereto in at least one adjoining upper delivery zone, and the regulating pump is set to the start of its control range during upward control when an auxiliary pump is switched on at the end of the control range and is set to the end of the control range during downward control when an auxiliary pump is switched off at the start of the control range.

In this method one can dispense with pressure storers, water towers or air vessels. The pressure in the system is instead maintained by the continuous control of the regulating pump and the introduction of one or more auxiliary pumps. The regulating pump is designed for only part of the entire delivery and is therefore not all too costly. The auxiliary pumps are in any case economical because of the constant manner of operation. With the aid of the regulator one can substantially avoid pressure fluctuations in the system. In addition, it is possible to bring about certain relationships between the demand and the pressure to be produced.

The control deviation can be subjected to a P and possibly I and D treatment. In this way one can satisfactorily regulate positive displacement pumps. However, the control deviation can additionally be subjected to a 'take the square root' operation. In this way one can linearize the output signal of the regulator when centrifugal pumps are used.

Another possibility is adding to the desired value a reference value which depends on the delivery. In this way one can take into account pressure drops in the conduit system that depend on the delivery, so that the pressure is also kept approximately constant at the consumers.

This reference value can for example be derived from the sum of the speeds of all the pumps or a corresponding parameter because this sum of the speeds corresponds to the delivery in the case of positive displacement pumps with a constant stroke.

It is advisable to filter higher frequencies out of the reference value. This leaves momentary pressure peaks in the system out of consideration whereas the pressure drop to the consumers is compensated in the case of real changes in consumption.

It is also favourable if, after resetting of the regulating pump, the control is interrupted for a predetermined rest period. In this way any momentary interference occurring after the switch-over will not have any influence on the control.

Further, the respective auxiliary pump to be started can be selected by the regulator according to a predetermined sequence. In this way the auxiliary pumps are not associated with definite delivery zones. One therefore obtains uniform wear.

A regulator for performing this method is characterised according to the invention by a micro-computer, a pressure sensor which delivers an analogue pressure signal, means for setting a desired pressure value, an analogue-digital converter device by way of which at least the pressure signal can be fed to the micro-computer in digital form, a control device provided for the regulating pump, a digital-analogue converter device by way of which a digital control setting signal delivered by the micro-computer can be fed in analogue form to said control device, and a switching apparatus provided for each auxiliary pump and to which a digital switching setting signal can be fed from the micro-computer.

Such a micro-computer can, by reason of its programming, not only compute the appropriate correcting variable from the controlled variable as a regulator but also divide the correcting variable into the control setting signal for the regulating pump and the switching setting signal for the auxiliary pumps, determine the sequence of the auxiliary pumps, execute additional computations for correction and compensation and perform other functions. Since the micro-computer operates only digitally, analogue-digital or digital-analogue converter devices are provided on the input and output sides if a digital control is not sufficient, such as in the case of the switching apparatus for the auxiliary pumps.

Adjustable constants such as desired pressure value or proportionality factor derivable as voltages from potentiometers can also be fed by way of the analogue-digital converter device. Since these potentiometers are successively scanned by the control mechanism of the micro-computer, such a converter device will suffice for introducing all constants into the computing process.

Further, it is favourable if the analogue-digital converter device comprises a comparator of which the first input is supplied with the analogue signals to be converted and the second input is connected to the analogue signal output of a digital-analogue converter, if the micro-computer has memories for digital signals which are successively connected to the input of the digital-analogue converter, and if the output signal depending on the result of comparison by the comparator successively feeds the contents of the digital signal memory to follow the respectively associated analogue signals. Since a digital-analogue converter can be made much simpler and cheaper than an analogue-digital converter, one can comparatively economically construct the desired analogue-digital converter device from such a digital-analogue converter, a comparator and appropriate memories of the micro-computer.

Further, provision may be made for a digit input device which is connected to an input of the micro-computer and with which the number of available auxiliary pumps can be introduced. In this way the micro-computer is kept informed as to how many auxiliary pumps are available.

It is also advantageous to have a programme switch which is connected to an input of the micro-computer for activating the 'take the square root' operation. One can therefore selectively use a normal P and possibly also an I and D treatment of the control deviation or, in addition to these, the said square root operation with which the output signal can be linearized.

Similarly, one can also provide a programme switch which is connected to an input of the micro-computer for taking a reference value depending on the delivery into account in the calculation of the setting signal. One can then selectively switch the regulator to such a programme. Further, it is recommended to have display means and a selectively actuatable-overswitch which the display means are connectible to digital signal memories for input values or values computed therefrom. In this way one can display the contents of the memory for different available data.

One can also provide change-over means which are connected to an input of the micro-computer for introducing different integration time constants. This gives a very large range when selecting these integration times.

The pressure sensor is desirably applied to the output of the pump arrangement. On the one hand this results in short connections and on the other hand in a comparatively small regulating circuit.

Figure 2:
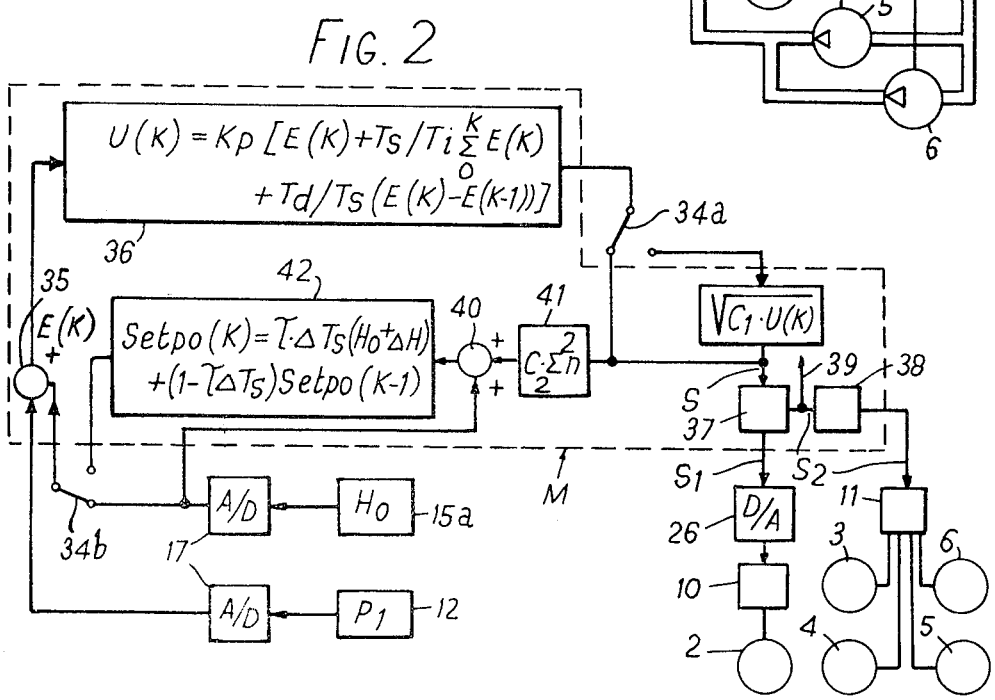

The invention will now be described in more detail with reference to an example illustrated in the drawing, wherein:

FIG. 1 is a circuit diagram of a regulator according to the invention with the associated pump arrangement, and FIG. 2 is a simplified block diagram showing the flow of signals in the FIG. 1 regulator.

FIG. 1 shows a pump arrangement 1 comprising a regulating pump 2 and four auxiliary pumps 3, 4, 5 and 6 which are all connected in parallel to one another in supply mains 7 and convey liquid through a common outlet 8 to consumers 9 (not shown). The present example concerns the supply mains of a waterworks having a very large number of consumers. The regulating pump 2 is controllable with the aid of a control mechanism 10 so that the delivery can be continuously changed from a minimum value to a maximum value in a predetermined control range. The auxiliary pumps 3 to 6 can be switched on and off by a switching apparatus 11, either individually or in any desired combination; they will then each give a constant delivery. The auxiliary pumps are of equal sizes. Their delivery is roughly equal to the difference between the maximum and minimum delivery of the regulating pump 2.

At the output 8 of the pump arrangement 1 there is a pressure sensor 12 which delivers an analogue pressure signal $p_1$. The pressure signal can be represented by a current between 0 and 20 mA which produces a voltage drop across a resistor $R_1$. Consequently, the pressure signal $P_1$ is available as a voltage at an input of an analogue signal change-over switch 13 which is operated by way of a control conduit 14 in such a way that its inputs are scanned once during each operating cycle. The other input of this analogue signal change-over switch 13 are connected to setting means $15a$ to $15f$, each of which consists of a potentiometer P which is connected between a fixed voltage $U_1$ and earth and the tapping of which is connected to the said input of the change-over switch 13. Purely by way of example, it is stated that the setting means $15a$ can set the pressure difference $H_o$, the setting means $15b$ can set the proportionality constant $K_p$, the setting means $15c$ can set the integral time $T_i$, the setting means $15d$ can set the differential period $T_d$, the setting means $15e$ can set a constant $C_2$ which is significant for the pressure drop in the supply mains, and the setting means $15f$ can set the rest position $T_m$.

The essence of the regulator is a micro-computer M to which the analogue output signals of the change-over switch 13 delivered by way of the conduit 16 can be fed by way of an analogue-digital device 17. For this purpose there is a comparator 18 of which the one input 19 is connected to the conduit 16 whereas its other input 20 communicates with the output of a digital-analogue converter 21 which, in turn, is connected by way of a data conduit 22 to digital signal memories 23 which are merely indicated in the micro-computer M. When the comparator 18 supplies a signal other than zero over its output conduit 24 to the micro-computer M, the respectively relevant digital signal memory 23 are changed until the zero signal is reached. In this way the digital values in the memories 23 are made to follow the analogue values of the pressure sensor 12 or the setting means $15a$ to $15f$.

The micro-computer M computes two output signals, namely a digital control setting signal $s_1$ and a digital switching setting signal $s_2$. The former is supplied by way of a data conduit 25 to a digital-analogue converter device 26. The latter delivers an analogue control setting signal by way of the analogue signal conduit 27 to the control device 10 which, in turn, determines the speed and thus the delivery of the regulating pump 2. By way of a data conduit 28, the digital switching setting signal $s_2$ passes, possibly by way of a conventional input/output apparatus, to the switching apparatus 11 in which one or more relays for switching the auxiliary pumps 3 to 6 are actuated by this signal.

Connected to the micro-computer M by way of a data conduit 29 there are display means 30 which, with the aid of a change-over switch 31, are connectible to a digital signal memory 23 for input values or values computed therefrom so that the numerical values thereof are displayed. By way of example, one can in this way display the set desired pressure value $H_0$, the measured pressure $p_1$ or any desired other value.

Change-over means 32 permit a selection of the range of the integral time $T_i$ within which the setting device $15c$ is to be effective. For example, in one setting the integral time can be infinite, in a second setting the integral time can be from 1 to 300 seconds and in a third setting the integral time can be from 0.5 to 20 minutes.

Further, a digit input device 33 is provided with which the number of available auxiliary pumps can be notified to the micro-computer M. This input can be digital. It suffices to connect switches to a constant voltage.

In addition, a block 34 with a plurality of programme switches is connected to an input of the micro-computer. For example, a first programme switch 34a may be provided for activating a 'take the square root' operation (see FIG. 2). A further programmed switch 34b can serve to take a reference value dependent on the delivery into account in the computation of the setting signal.

To explain the manner of operation, reference is made to FIG. 2.

In the illustrated operating position, a comparator circuit 35 is fed on the one hand with the desired pressure value $H_0$ and the measured pressure value $p_1$. The control deviation $E(K)$ is subjected to a PID treatment as shown in the block 36. The sample period $T_s$ which is also mentioned therein can for example be 100 seconds. The other values have already been described above. The value $U(K)$ thus formed directly constitutes the setting signal s which, in a dividing stage 37, is subdivided into the control setting signal $s_1$ and the switching setting signal $s_2$ in such a way that they are together a measurement of the entire required delivery. The switching setting signal $s_2$ is passed over a sequence selector stage 38 which delivers a modified switching setting signal $s'_2$. In this way one ensures that the auxiliary pumps 3 to 6 will always be successively operated in the same sequence. Since the switching setting signal $s_2$ can change only in discrete steps, the switching operation of the auxiliary pumps 3 to 6 or the change-over operation of the regulating pump 2 can be accurately determined, whereupon the regulating operation in the micro-computer M is interrupted (in a manner not shown) for a predetermined rest period $T_m$.

It was previously assumed that the pumps 2 to 6 are positive displacement pumps. However, one can also use centrifugal pumps. For this purpose the programme switch 34a is changed to the other position. One then no longer obtains the value $U(K)$ as the setting signal s but its square root associated with a factor $C_l$. This enables the output value, i.e. the delivery, to be linearlized with reference to the measured pressure.

When the programme switch 34b is switched over, the desired pressure value $H_0$ has superimposed on it in a summating circuit 40 a reference value $C_2 \cdot \Sigma^2 n$, which corresponds to an additional pressure drop $\Delta H$ as occurring in the supply mains in the case of higher deliveries. This expression is formed in a block 41, namely directly from the setting quantity s which, in the case of positive displacement pumps with a constant stroke, is proportional to the value of the rotary speed. The sum of the desired value and reference value is processed in a low-pass filter 42 which filters out higher frequencies and thus pressure peaks of short duration. One thus obtains a comparatively quiescent compensated desired parameter value setpo according to FIG. 2 of the drawing. The computing formula will be evident from the legend in block 42. As a new parameter there merely occurs a fixed period $\tau$ of about 600 seconds. With this one can achieve that the pressure at the consumer remains substantially constant even if the delivery has to be considerably altered because of different consumption.

Sub-dividing of the setting signal s in the dividing stage takes place so that at low values (= lower delivery zone) only the regulating pump 2 will operate. Upon further increase of s, the auxiliary pumps 3 to 6 are switched on successively, the regulating pump being simultaneously switched over from the end to the start of its control range. The sections between switching on of the one and switching on of the next auxiliary pump are designated upper delivery zones. Upon a reduction in s, switching takes place in the reverse sequence. The display means are designed so that a change in the display is possible at intervals of about 1 second. The switches of the digit input device 33 and the programme switch block 34 may be disposed in a single module disposed on a printed circuit in the equipment. The analogue signals can be represented throughout by a current of 0 to 20 mA or a corresponding voltage.

The regulator is not only suitable for waterworks but also for remote heating plants, refrigeration plants or air-conditioning installations and above all wherever the provision of a pressure reservoir encounters difficulties.

What is claimed is:

1. A method for controlling according to demand the delivery of a pumping station having pumps arranged in parallel including one variable speed pump and a plurality of constant speed pumps each having on and off operating modes, said method comprising the steps of sensing and converting an actual signal which corresponds to condition on the output side of said station to a usable signal, comparing said usable signal to a preset signal corresponding to a predetermined pressure to develop a primary control signal, forming first and second derivative control signals from said primary control signal, utilizing said second derivative control signal as a feedback signal to operate one fewer of said constant speed pumps than would be required to equal or exceed said predetermined pressure, and utilizing said first derivative control signal as a feedback signal to modulatingly operate said variable speed pump to adjustably achieve said predetermined pressure.

2. A method according to claim 1 wherein said constant speed pumps are operated in different sequences so that each said constant speed pump is operated in different pressure ranges to provide more even wear for said constant speed pumps.

3. A method according to claim 1 wherein said preset signal is derived from the speed characteristics of said pumps.

* * * * *